3,235,559
PROCESS FOR THE PRODUCTION OF
2-MERCAPTOBENZIMIDAZOLE
Karl-Heinz Blöcher, Albrecht Schultze, and Hermann Wolz, Leverkusen, Germany, assignors to Farbenfabriken Bayer Aktiengesellschaft, Leverkusen, Germany, a corporation of Germany
No Drawing. Filed Dec. 11, 1962, Ser. No. 243,717
Claims priority, application Germany, Dec. 23, 1961,
F 35,649
2 Claims. (Cl. 260—309.2)

This invention relates to the production of 2-mercaptobenzimidazole.

It is known that 2 mercaptobenzimidazole can be obtained by reacting o-phenylene diamine with carbon disulfide and an alkali-metal hydroxide to form the alkali-metal salt of benzimidazole and that the 2-mercaptobenzimidazole can be liberated therefrom by treatment with acid. The o-phenylene diamine is prepared by the reduction of o-nitraniline with sodium sulfide solution. This process is complicated and, when starting from o-nitraniline, only gives a yield of 75%. Furthermore, the total reaction period is about 40 hours. Hydrogen sulfide is formed as a secondary product from unreacted sodium sulfide and sodium thiosulfate. Sulfur and sulfur dioxide are obtained as other additional products.

It is an object of the present invention to provide a new process for the production of 2-mercaptobenzimidazole. A further object is to provide a simple economical process. Further objects will appear hereinafter.

It has now been found that these objects can be attained and that 2-mercaptobenzimidazole can be produced substantially more economically in a one-stage process if o-nitraniline, carbon disulfide and hydrogen sulfide or a water-soluble acid or neutral salt of hydrogen sulfide are reacted at temperatures of approximately 40–250° C. and at pressures of about 0–100 atm. gauge.

The process according to the invention, when using sodium hydrogen sulfide as acid salt of hydrogen sulfide, can be characterized by the following reaction diagram:

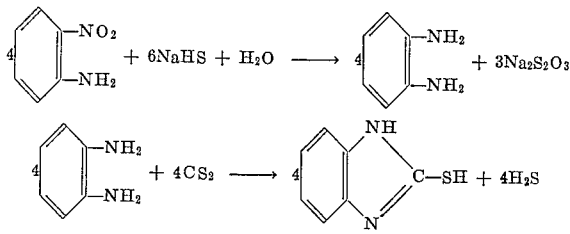

It is advantageous to use the acid or neutral salts of hydrogen sulfide, such as sodium or potassium hydrogen sulfide, $Na_2S$, $K_2S$ or $Ca(SH)_2$. However, if desired, it is also possible to produce the acid hydrogen sulfide salts in the reaction mixture itself, for example, by adding one or two equivalents of an inorganic base, such as sodium or potassium hydroxide or calcium hydroxide and one mole of hydrogen sulfide. The mole ratio of o-nitraniline and the sulfide ions shall be about 1:0.75 to 1:2, preferably about 1:1.75. The mole ratio of o-nitraniline to carbon disulfide shall be about 1:1 to 1:1.5, preferably about 1:1.5. The reaction is advantageously carried out in a temperature range between 100 and 160° C. and at pressures in the range of from 10 to 20 atm. gauge. The process can be carried out continuously or batchwise.

By comparison with the hitherto known process, the process according to the invention has the advantage that the 2-mercaptobenzimidazole is obtained in a substantially better yield, related to the o-nitraniline, and the reaction time is substantially shortened, so that the apparatus can be utilized to a substantially better degree. Furthermore, the 2-mercaptobenzimidazole can be obtained directly in free form and not as an alkali-metal salt by the process according to the invention, so that the acidification of the reaction product is dispensed with and a continuous operational procedure is made possible. If the process is carried out continuously, the yield per unit volume of reactor space per unit time may be fifty times the yield of a batchwise process. However, if it is desired to have the salt of the 2-mercaptobenzimidazole as a reaction product, it can be simply obtained by adding a base. By adding acid, the free 2-mercaptobenzimidazole can be obtained again from the salt.

Example 1

A mixture of 138 g. of o-nitraniline as a moist 82% nitraniline containing product
180 ml. of NaHS solution (39.5 g. NaHS/100 ml.)=71 g. NaHS (1.27 mols)
500 ml. of $H_2O$, and
85 g. of carbon disulfide (1.12 mols)

are heated in a stirrer-type autoclave with a capacity of 2 liters for a period of one hour to 120° C. and kept for another three hours at a temperature of 120 to 130° C. The pressure rises initially to 10 atm. gauge and falls slowly to 4 atm. gauge (at 130° C.) and is unaltered within the next two hours when the temperature is kept constant. The autoclave is cooled to room temperature and the contents are suction-filtered and washed with water. The filter cake, which contains a large quantity of elementary sulfur as well as 2-mercaptobenzimidazole, is stirred with 3 liters of a substantially 10% aqueous calcium of hydroxide suspension and 10 g. of active charcoal or carbon, suction-filtered and washed. The filtrate is just acidified with concentrated hydrochloric acid, the precipitate which is 2-mercaptobenzimidazole is suction-filtered, washed and dried at 90 to 100° C.

Yield: 115.3 g.=94% of the theoretical; melting point: 300 to 303° C.

Example 2

The same mixture as described in Example 1 is heated in the autoclave for one hour to 160° C. and kept for three hours at 150 to 160° C. The pressure rises initially to 11.5 atm. gauge, falls slowly over a period of one hour to 7 atm. gauge (at 150° C.) and does not change any more in the next two hours.

The contents of the autoclave are worked up as described in Example 1.

Yield: 120.9 g.=98% of the theoretical; melting point: 298 to 300° C.

Example 3

A mixture of 69 g. of o-nitraniline (0.5 mol)
180 g. of $Na_2S \cdot 9H_2O$ (0.75 mol)
100 ml. of water, and
42 g. of carbon disulfide (0.55 mol)

is heated in an autoclave with stirrer with a capacity of 0.7 liter within one hour to 130° C. Thereafter, the reaction mixture is stirred for another three hours at 130 to 140° C. The pressure rises to 2.2 atm. gauge (at 140° C.) and is unaltered if the temperature is kept constant.

The reaction mixture is worked up as described in Example 1.

Yield: 73.2 g.=98.7% of the theoretical; melting point: 295 to 297° C.

Example 4

A mixture of 69 g. of o-nitraniline (0.5 mol)
400 ml. of a $Ca(SH_2)$-solution containing 21.4 g. of $Ca(SH)_2/100$ ml.=85.6 g. of $Ca(SH)_2$ (0.4 mol)
42 g. of carbon disulfide (0.55 mol)

is heated in a stirrer-type autoclave with a capacity of 0.7 liter within one hour to 100° C. The temperature rises to 140° C. and the pressure to about 10 atm. gauge. The mixture is then heated for another three hours to 138 to 140° C., whereby the pressure drops to 2.2 atm. gauge (at 138° C.).

The reaction mixture is worked up as described in Example 1.

Yield: 68.5 g.=90.7% of the theoretical; melting point: 291 to 296° C.

Example 5

A mixture of 69 g. of o-nitraniline (0.5 mol)
200 ml. of KHS-solution containing 27.0 g. KHS/100 ml.=54 g. of KHS (0.75 mol)
100 ml. of water, and
42 g. of carbon disulfide (0.55 mol)

is heated in a stirrer-type autoclave with a capacity of 0.7 liter to 120° C. This temperature is kept for three hours. The pressure rises to 18.5 atm. gauge and drops upon stirring to 3.5 atm. gauge (at 120° C.).

The reaction mixture is worked up as described in Example 1.

Yield: 71.3 g.=95.0% of the theoretical; melting point: 289 to 294° C.

Example 6

A mixture of 69 g. of o-nitraniline (0.5 mol)
82.5 g. of $K_2S$ (0.75 mol)
300 ml. of water, and
42 g. of carbon disulfide (0.55 mol)

is heated in a stirrer-type autoclave with a capacity of 0.7 liter within one hour to 140° C. The temperature is kept for three hours. The pressure rises to 4.5 atm. gauge and drops upon stirring to 3 atm. gauge.

The reaction mixture is worked up as described in Example 1.

Yield: 69.8 g.=93.1% of the theoretical; melting point: 297 to 300° C.

Example 7

Into a suspension of 69 g. of o-nitraniline (0.5 mol)
200 ml. of water, and
60 g. of caustic soda solution (50%)=30 g. of NaOH (0.75 mol)

hydrogen sulfide is introduced until the filtrate has reached a pH-value of 9.4. Then there are added 42 g. of carbon disulfide (0.55 mol), and the suspension is heated in a stirrer-type autoclave with a capacity of 0.7 liter within one hour to 130° C. The pressure rises to 8.4 atm. gauge and drops upon stirring for three hours at 2.0 atm. gauge (at 130° C.).

The reaction mixture is worked up as described in Example 1.

Yield: 70.1 g.=93.5% of theoretical; melting point: 297 to 300° C.

We claim:

1. A process for the production of 2-mercaptobenzimidazole which comprises reacting o-nitraniline, carbon disulfide and a salt of the group consisting of the sulfides and hydrogen sulfides of the alkali metals and calcium hydrogen sulfide at a temperature between 40 and 250° C. and at superatmospheric pressure between 10 and 20 atmospheres gauge and recovering the 2-mercaptobenzimidazole formed.

2. The process as defined in claim 1 in which the pressure is between 2.0 and 18.5 atmospheres gauge.

References Cited by the Examiner

Kawaoka: Journ. Soc. Chem. Industry (Japan), supplemental binding, vol. 43, pp. 275B–77B (1940).

Porai: Koshits Chemical Abstracts, vol. 38, pp. 1234–5 (1944).

WALTER A. MODANCE, *Primary Examiner.*

NICHOLAS S. RIZZO, *Examiner.*